United States Patent [19]

Lin et al.

[11] 4,314,053

[45] Feb. 2, 1982

[54] PROCESS FOR REDUCING POLYOLEFIN DIE SMOKE

[75] Inventors: Chi-Hung Lin, Wheaton; Linus K. Leung, Naperville, both of Ill.

[73] Assignee: Standard Oil Company (Indiana), Chicago, Ill.

[21] Appl. No.: 147,838

[22] Filed: May 8, 1980

[51] Int. Cl.³ ............................ C08F 6/00; C08F 6/08
[52] U.S. Cl. .................................... 528/483; 264/211; 528/491; 528/494; 528/496; 528/499
[58] Field of Search ............... 528/496, 483, 480, 490, 528/491, 494

[56] References Cited

U.S. PATENT DOCUMENTS

| 3,554,995 | 1/1971 | McCray | 528/496 X |
| 3,733,314 | 5/1973 | Marwil | 528/496 X |
| 4,029,877 | 6/1977 | Yoshiura | 528/483 |
| 4,156,075 | 5/1979 | Holliday | 528/483 |
| 4,167,619 | 9/1979 | Van Mannekes | 528/483 |

Primary Examiner—C. A. Henderson
Attorney, Agent, or Firm—Wallace L. Oliver; William T. McClain; William H. Magidson

[57] ABSTRACT

Polyolefin polymer powder containing active catalyst residues is deactivated by (1) purging with an inert gas containing water vapor and (2) then contacting such powder with a gas mixture containing an inert gas, water vapor, and a third component selected from the group consisting of oxygen, carbon monoxide, carbon dioxide, $C_1$–$C_4$ alcohols and $C_2$–$C_4$ alkeneoxides.

4 Claims, No Drawings

PROCESS FOR REDUCING POLYOLEFIN DIE SMOKE

BACKGROUND OF THE INVENTION

This invention relates to olefin polymerization and more particularly relates to deactivating catalyst residues and to removal of the volatiles and oligomers from polyolefins, especially polypropylene.

In production of high molecular weight, solid, polyolefins, typically low molecular weight volatile species such as oligomers also are produced. If high levels of oligomeric materials remain in the polymer, problems typically are encountered when the polymer is used in commercial molding machines in that excessive smoke, referred to as "die smoke", is produced.

Also in the manufacture of polyolefins, especially propylene polymers, catalyst residue remains in the polymer after polymerization. This residue typically must be deactivated in order to avoid polymer corrosivity.

The invention described herein presents a method which effectively deactivates polymerization catalyst residue, while minimizing die smoke in subsequent polymer processing.

SUMMARY OF THE INVENTION

Polyolefin polymer powder containing active catalyst residues is deactivated by (1) purging with an inert gas containing water vapor and (2) then contacting such powder with a gas mixture containing an inert gas, water vapor, and a third component selected from the group consisting of oxygen, carbon monoxide, carbon dioxide, $C_1$–$C_4$ alcohols and $C_2$–$C_4$ alkeneoxides. The resulting polymer exhibits reduced die smoke when processed.

BRIEF DESCRIPTION OF THE INVENTION

Polymers may be formed in a solution or a slurry in a suitable solvent or diluent, typically a liquid hydrocarbon such as hexane or heptane. Alternatively polymerization may occur in bulk liquid monomer, for example, liquid propylene, or may occur in the vapor phase. It has been found that if a polyolefin such as polypropylene is formed in bulk or in vapor phase the amount of oligomeric-type material left in the polymer is increased over the amount present in solution or slurry-phase products. Thus the invention disclosed herein is most suitable to bulk or vapor phase polymerization processes.

Oligomeric-type material present in a polypropylene resin may be attributed to several causes. Oligomers may be formed during polymerization as non-stereospecific polymers or as a result of fast chain terminations and transfers. Also propylene monomer may be trapped inside polymer powder which may undergo polymerization during a catalyst deactivation step. Further, oligomers may form as degradation products during catalyst deactivation or during molten-phase polymer processing. The present invention is directed to reducing oligomer production related to trapped monomer and polymer degradation.

Although other methods have been tried to reduce die smoke such as a single-stage treatment with an "inert" gas (e.g. nitrogen, water vapor, noble gas hydrogen, paraffinic gas) at elevated temperatures below the polymer softening point, and incorporation of additives such as Group IA and IIA metal oxides, stearates, pelargonates, carbonates, bicarbonates, bisulfates and hydroxides, the two-stage method of the present invention exhibits advantages in effectiveness of deactivation and oligomer removal.

In the method of this invention undeactivated polyolefin powder first is purged with an inert gas, such as nitrogen, at a temperature ranging from about 180° F. to about 10° F. below the polymer softening point typically for about 10 to about 90 minutes, then contacted with a gas stream containing an inert gas, water vapor and a third component selected from the group consisting of oxygen, carbon monoxide, carbon dioxide, a $C_1$–$C_4$ alcohol and a $C_2$–$C_4$ alkene oxide at a temperature ranging from about 180° F. to about 10° F. below the softening point of the polymer for about 10 to about 120 minutes.

In more detail our invention is a process of deactivating polymer powder containing "live" catalyst residues in a two-stage operation. The first stage comprises purging the live polymer powder with a gas inert to the conditions used, such as nitrogen, which contains water vapor. Typically, the polymer powder is treated with wet nitrogen in a fluidized bed, although other batch or continuous contact means can be used. Contact time in the first stage typically is about 10 to about 90 minutes and preferably about 30 to about 60 minutes at an operating temperature of about 180° F. to about 10° F. below the polymer softening point with the gas mixture having a maximum dew point about 20° F. below the operating temperature. Typically the dew point is about 40° to about 150° F. which corresponds to about 0.5 to about 20 wt.% water vapor content.

After the live polymer powder is purged with wet inert gas in the first stage, the powder is transferred to a second stage and treated, batchwise or continuously, with a stream of inert gas (usually nitrogen), water vapor, and a third component such as oxygen, carbon monoxide, carbon dioxide, $C_1$–$C_4$ alcohol or $C_2$–$C_4$ alkeneoxides. Oxygen is preferred. The third component is present in the gas mixture at about 0.01 to 10 vol.% and preferably about 0.05 to 6 vol.%. The dew point of the gas mixture typically is maintained at about 20° F. below operating temperature. The operating temperature is maintained between about 180° F. to about 10° F. below the softening point of the polymer. For polypropylene homopolymer it has been found that the preferable temperature is about 240° F. or below. Typical contact time in the second stage is about 10 to 120 minutes and preferably is about 15 to 30 minutes. The preferable deactivation reactor for the second stage is a fluidized bed.

The polyolefin most useful in this invention is propylene polymer, that is propylene homopolymer and copolymers of propylene containing minor amounts of ethylene or other copolymerizable alpha-olefins. Other polyolefins in which catalyst deactivation and removal of oligomers is necessary also can be used. Such polyolefins typically are prepared by contacting an olefin monomer with a catalyst comprising a transition metal compound, such as a titanium compound, usually a titanium trihalide, and an aluminum alkyl. Other substances can be present in minor amounts as catalyst modifiers.

The catalyst useful in olefin polymerization system from which powder can be deactivated according to this invention contains (1) an organoaluminum compound and (b) a transition metal compound.

Useful organoaluminum compounds include trialkylaluminum, dialkylaluminum halides, mixtures of trialkylaluminum with dialkylaluminum halides and mixtures of trialkylaluminum with alkylaluminum dihalides. Also catalytic effective amounts of mixtures of trialkylaluminum and dialkylaluminum halides can be used in conjunction with alkyl aluminum dihalides. Useful halides include bromides and chlorides and useful alkyl radicals contain from two to about six carbon atoms. The preferable halide is chloride and the preferable alkyl radical is ethyl. Diethylaluminum chloride (DEAC) is most preferable in propylene polymerizations. In a trialkylaluminum-dialkylaluminum halide mixture, the preferred amount of trialkylaluminum is about 20 to 50 mol percent. In a trialkylaluminum-alkylaluminum dihalide mixture, the preferred amount of trialkylaluminum is about 30 to 70 mol percent and most preferably about 40 to 60 mol percent.

The transition metal compounds useful as a component in the catalyst system of this invention are compounds of transition metals of Group IVB, VB and VIB of the Periodic Table. Preferably, the transition metal compound is a halide of titanium, vanadium, chromium or zirconium. Most preferably, titanium trichloride and especially activated titanium trichloride is used for propylene polymerizations. Titanium trichloride can be activated to a high degree of polymerization activity by chemical and physical means. One activated titanium trichloride has an approximate stoichiometric formula of $TiCl_3 \cdot \frac{1}{3}AlCl_3$ and has been comminuted. Further, titanium trichloride can be activated by forming adducts with Lewis bases such as ethers or by supporting the titanium trichloride on a catalytically inert substance such as a metal oxide or salt. One suitable titanium trichloride is described in U.S. Pat. No. 3,984,350 incorporated by reference herein.

The molar ratio of transition metal halide to organoaluminum compound in a catalyst system can range from about one-tenth to about 10, typically is about 1 to 3 and preferably is about 2. The amount of catalyst in a polymerization depends on the reactor size and type and on the amount and type of olefin monomer and is known to the skilled artisan.

Catalyst additives can be added in minor amounts such as disclosed in U.S. Pat. Nos. 3,950,268 and 4,072,809 incorporated herein by reference.

Gas phase reactor systems include both stirred bed reactors and fluidized bed reactor systems. Examples of such reactor systems are described in U.S. Pat. Nos. 3,957,448, 3,965,083, 3,971,768, 3,970,611, 4,129,701, 4,101,289, 3,652,527, and 4,003,712 all incorporated by reference herein. Typical gas phase olefin polymerization reactor systems comprise a reactor vessel to which olefin monomer and catalyst components can be added and which contain a bed of forming polymer particles. Typically, catalyst components are added together or separately through one or more valve-controlled ports in the reactor vessel. Olefin monomer, typically, is provided to the reactor through a recycle gas system in which unreacted monomer removed as off gas and fresh feed monomer are mixed and injected into the reactor vessel. A quench liquid can be added to polymerizing olefin in order to control temperature.

If polymer powder is produced in a bulk polymerization process, excess monomer should be removed, such as by flash drying, before deactivation according to this invention.

This invention is demonstrated, but not limited, by the following Examples.

EXAMPLES I–III

Samples of polypropylene powder produced by gas-phase polymerization containing active ("live") catalyst residues were deactivated in a bench-scale fluid bed apparatus comprising a vertical cylindrical chamber four inches in diameter and eight inches high equipped with a gas inlet at the bottom and a vent at the top. Nitrogen gas and distilled water were blended at metered flow rates to give a desired flow rate and dew point, passed through a heater, and then injected into the bottom of the fluid bed apparatus.

Before conducting a deactivation experiment, approximately 350 grams of live polypropylene powder was charged to the fluid bed apparatus and flow rate, dew point and temperature stabilized at desired levels. Typically, polymer powder bed temperature was maintained at 200°–280° F. and nitrogen flow rate maintained at 2.5–3.5 SCFM. In conducting a deactivation experiment a sample of live powder was charged to the fluid bed after which time the bed temperature dropped sharply and then returned gradually to the initial temperature. After maintaining the powder at the stabilized temperature for about 1 hour, the powder was allowed to cool to about 120° F. and then removed and evaluated for die smoke.

Deactivated polypropylene powder was tested for die smoke by observing die smoke while powder and stabilizers were extruded. Deactivated powder blended with 0.1 wt.% BHT, 0.1 wt.% Q 328 (trade name for an antioxidant and process stabilizer sold by Argus Chemical Company), and 0.05 wt.% calcium stearate were extruded in a 1¼ inch Killian single-screw extruder maintained at a 425/450/475/500° F. temperature profile at a rate of about 10 pounds per hour. Photographs were taken of smoke coming from the top of the die head and visually rated as none, very light, light, light-moderate, moderate, moderate-heavy, heavy and very heavy.

A series of experiments was performed to demonstrate the usefulness of our invention. In the first experiment (Run A) live polypropylene powder was deactivated in the described fluid bed apparatus for 60 minutes with wet nitrogen. After testing, the die smoke associated with the resulting deactivated product was rated as moderate. In the second and third experiments (Examples I and II) live polypropylene powder was treated with wet nitrogen in the fluid bed for 30 minutes followed by treatment with a mixture of wet nitrogen and 5% oxygen. Die smoke from these products was rated light-moderate and light respectively.

Similarly, in another set of experiments using lower deactivation temperatures a product deactivated with only wet nitrogen (Run B) gave a die smoke rating of light-moderate, while a product treated with a mixture of nitrogen and oxygen (Example III) yielded a smoke rating of light. The results of these experiments are summarized in the Table.

Polypropylene powder used in these experiments was produced in a gas phase reactor system similar to that described in U.S. Pat. No. 3,965,083. A cylindrical reactor vessel of approximately 8 inches in diameter and 24 inches in length was equipped with three recycle gas nozzles spaced equidistantly along the bottom of reactor and three liquid quench nozzles spaced equidistantly along the top of the reactor. The reactor is equipped with an off gas port for recycling reactor gas through a condenser and back through a recycle gas line to the recycle gas nozzles in the reactor. During reactor operation polypropylene powder was produced in the reactor bed, flowed over a weir, and discharged through a powder discharge system into a secondary closed vessel blanketed with nitrogen. Powder was collected from the secondary vessel. Polymerization temperature and pressure were maintained at 160° F. and 300 psig respectively. Chemically activated titanium trichloride obtained from Solvay & Cie and diethylaluminum chloride in hexane solution were introduced into the reactor as catalyst components as two streams.

TABLE

| Deactivation Conditions | Run A | Ex. I | Ex. II | Run B | Ex. III |
| --- | --- | --- | --- | --- | --- |
| First Stage Gas Components | | | | | |
| Nitrogen (wt. %) | 92 | 92 | 92 | 92 | 92 |
| Water Vapor (wt. %) | 8 | 8 | 8 | 8 | 8 |
| Dew Point (°F.) (1) | 120 | 120 | 120 | 120 | 120 |
| Time (minutes) | 60 | 30 | 30 | 60 | 30 |
| Temperature (°F.) | 265 | 265 | 265 | 240 | 240 |
| Second Stage Gas Components | | | | | |
| Nitrogen (wt. %) | — | 87 | 87 | — | 87 |
| Oxygen (wt. %) | — | 5 | 5 | — | 5 |
| Water Vapor (wt. %) | — | 8 | 8 | — | 8 |
| Dew Point (°F.) (1) | — | 120 | 120 | — | 120 |
| Time (minutes) | — | 15 | 25 | — | 20 |
| Temperature (°F.) | — | 265 | 210 | — | 240 |
| Die Smoke Rating (2) | M | L-M | L | L-M | L |

(1) At a 120° F. dew point, gas contains 8 wt. % water vapor.
(2) L = light; L-M = light-moderate; M = moderate

We claim:

1. A method of deactivating polyolefin powder containing active catalyst comprising (1) contacting said polymer with an inert gas containing about 4 to about 10 weight percent water vapor for about 10 to 90 minutes at a temperature between about 180° F. and about 10° F. below the softening point of the polymer, and (2) then contacting such powder with an inert gas containing about 4 to about 10 weight percent water vapor and about 0.05 to about 6 volume percent oxygen for about 10 to about 120 minutes at a temperature between about 180° F. and about 10° F. below the softening point of the polymer in a fluidized bed.

2. The method of claim 1 wherein the polyolefin is propylene homopolymer, or copolymers of propylene containing minor amounts of ethylene or other copolymerizable alpha-olefins.

3. The method of claim 1 wherein the inert gas is nitrogen.

4. The method of claim 1 wherein propylene homopolymer powder containing active catalyst is (1) contacted with nitrogen containing about 8 weight percent water vapor for about 30 to about 60 minutes at about 180° to about 240° F., and (2) then contacted with nitrogen containing about 8 weight percent water vapor and about 5 weight percent oxygen for about 15 to 30 minutes at about 180° to about 240° F. in a fluidized bed.

* * * * *